United States Patent Office 3,459,466
Patented Aug. 5, 1969

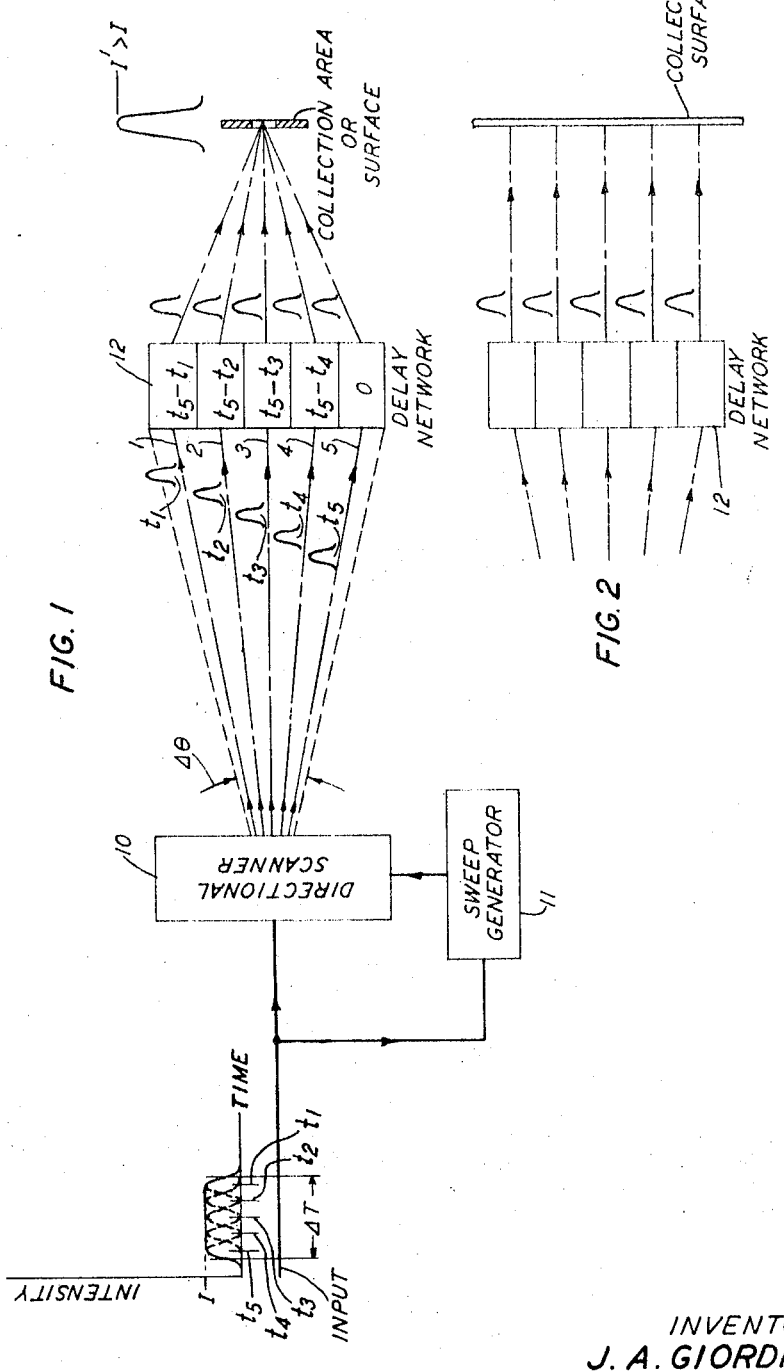

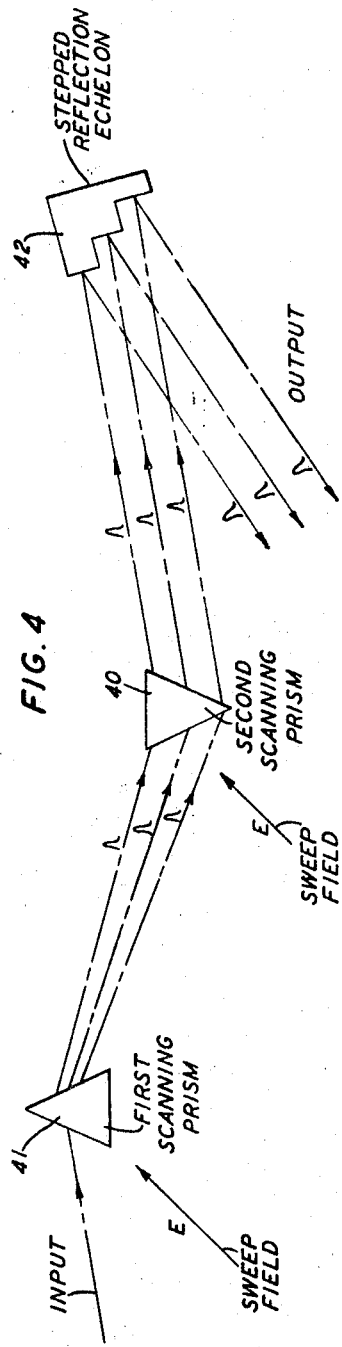

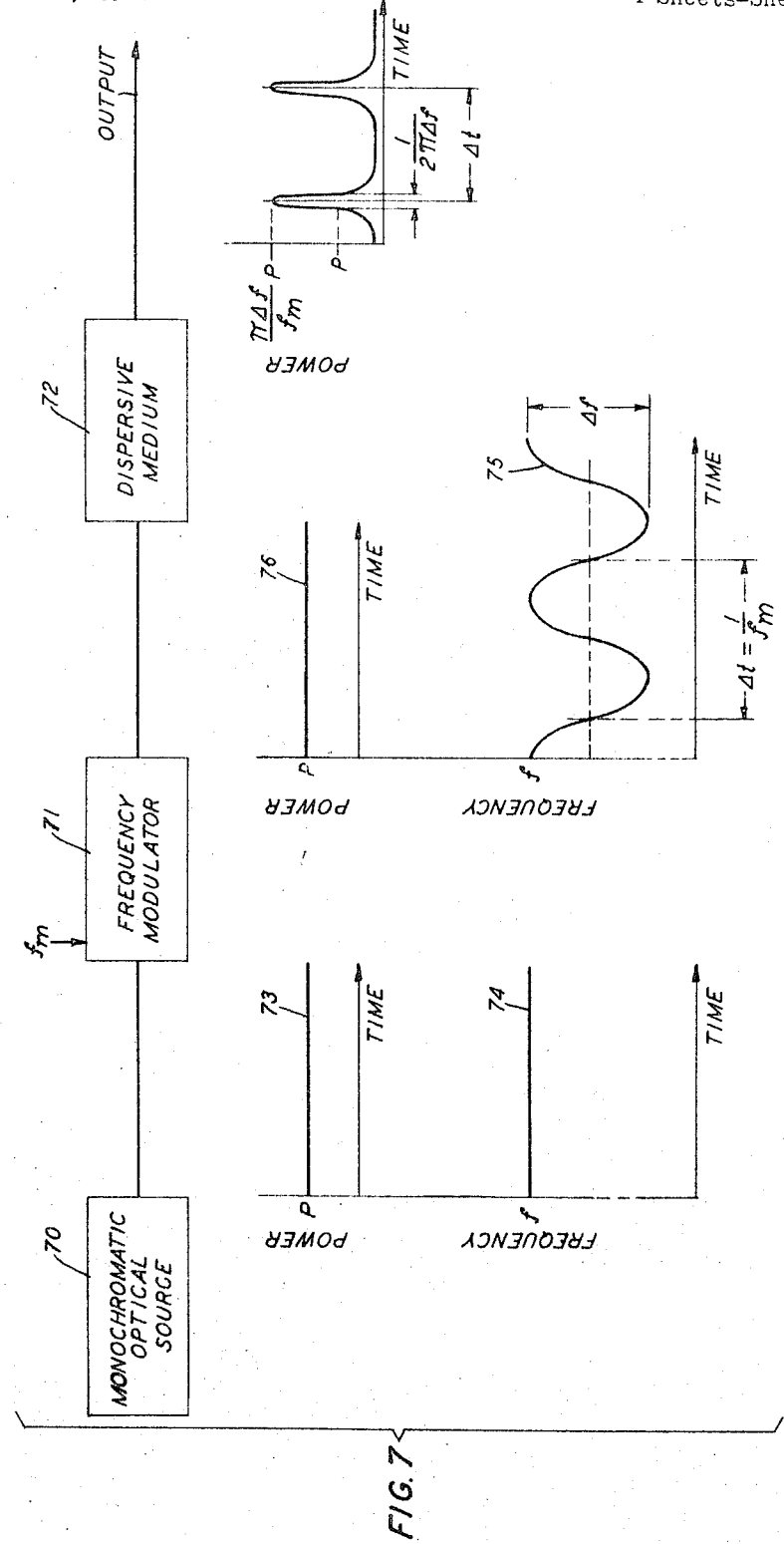

3,459,466
OPTICAL BEAM PEAK POWER AMPLIFIER AND BUNCHER
Joseph A. Giordmaine, Summit, N.J., assignor to Bell Telephone Laboratories, Incorporated, New York, N.Y., a corporation of New York
Filed Dec. 30, 1964, Ser. No. 422,222
Int. Cl. G02f 1/28
U.S. Cl. 350—160                    13 Claims

ABSTRACT OF THE DISCLOSURE

This application describes arrangements for increasing the peak power of an optical pulse. In accordance with one embodiment, a pulse of optical energy is divided into a plurality of spacially separate portions displaced in time relative to each other. The separate portions are then delayed different relative lengths of time such that they reassemble in time coincidence. The effect is to compress the energy in the optical pulse into a smaller time interval.

In a second embodiment, the wave energy is frequency modulated and then passed through a dispersive medium which delays the different frequency component different periods of time to produce the desired compression.

The same technique can be used to convert a continuous wave beam into pulses.

---

This invention relates to optical wave peak power amplifiers and optical wave bunching devices.

The development of the optical maser, or "laser" has made available sources of electromagnetic wave energy in the infrared, visible and ultraviolet portions of the frequency spectrum, hereinafter referred to collectively as "optical" waves, which are characterized by a high degree of monochromaticity and coherence. Many uses for the laser have been suggested. These includes uses in optical radars, harmonic generators, surgical instruments and chemical reactions, to note but a few by way of example. As each of these uses can, in most instances, be benefited by optical beams of greater peak power, it is the broad object of this invention to increase the instantaneous power of optical beams.

In accordance with embodiments of the present invention, this broad object is realized by changing either the position, or the direction of propagation, of an optical beam as a function of time, thereby distributing the energy of the beam in both space and time. The distributed wave energy is then reassembled in time coincidence by the introduction, within the transmission path, of a time-delay which varies as a function of the location of the swept beam.

If the beam components derived from the delay network are focused upon a common focal area, the result is to produce a bunched optical beam of greater peak intensity (i.e., illuminance) than is available from the input beam. If the beam components leaving the delay network are directed along parallel paths, the result is to produce a bunched optical beam of increased aperture, having, in the region of the delay network, an intensity that is equal to that of the input beam, less transmission losses.

In one of the several illustrative embodiments of the invention to be described in greater detail hereinafter, the direction of propagation of the incident wave is swept through a range of angles by means of a scanning prism whose index of refraction is caused to vary by the application to the prism of an electric field of changing amplitude. At a distance from the output aperture of the scanning prism, and within the angular distribution of the swept beam, there is located a time-delay mechanism for introducing a delay which varies as a predetermined function of position within the angular range of the swept beam.

In this one particular illustrative embodiment, delay is produced by means of a reflecting echelon having a stepped reflecting surface. The depth, or offset, of each step is related to the manner in which the direction of propagation of the optical beam is caused to vary as a function of time. For a linear variation in direction, the steps are uniform and equal to $v\Delta T/2N$, where $N$ is the number of steps, $\Delta T$ the duration of the sweep over the $N$ steps, and $v$ the velocity of propagation. The wave energy incident upon the echelon is reflected in time coincidence to produce an optical pulse of greater peak power than the original beam, and of time duration $\Delta T/N$.

Various other illustrative embodiments and arrangements of the present invention are also described using scanners which transversely translate the beam, and using stepped transmission echelons and optical fibers as delay networks.

In accordance with an alternate embodiment of the present invention, the broad object of the invention can also be realized by sweeping the instantaneous frequency of the input optical beam over the frequency range $\Delta f$ in a time interval $\Delta t$, thereby distributing the energy of the input beam in both frequency and time. The distributed wave energy is then passed through a dispersive medium which provides a differential delay of $\Delta t$ over the frequency range $\Delta f$. As a result of this differential delay, the energy at the beginning of the interval $\Delta t$ reaches the output end of the dispersive network at the same time as the energy at the end portion of the time interval to produce a pulse of energy of greater peak power and of time duration $1/2\pi\Delta f$.

The advantages and features of the present invention will appear more fully upon consideration of these various illustrative embodiments now to be described in greater detail in connection with the accompanying drawings, in which:

FIG. 1 shows, in block diagram, an optical wave peak power amplifier in accordance with the preferred embodiment of the present invention;

FIG. 2 shows an alternate arrangement wherein the output pulses leave the delay network along parallel paths;

FIG. 4 shows a modified arrangement of the invention using two scanning prisms;

FIG. 5 illustrates the use of a stepped transmission echelon as a delay network;

FIG. 6 illustrates the use of optical fibers as a delay network; and

FIG. 7 shows in block diagram the basic elements of an optical wave peak amplifier and buncher in accordance with an embodiment of the present invention which employs a dispersive network for peaking the instantaneous power.

Figure 3:
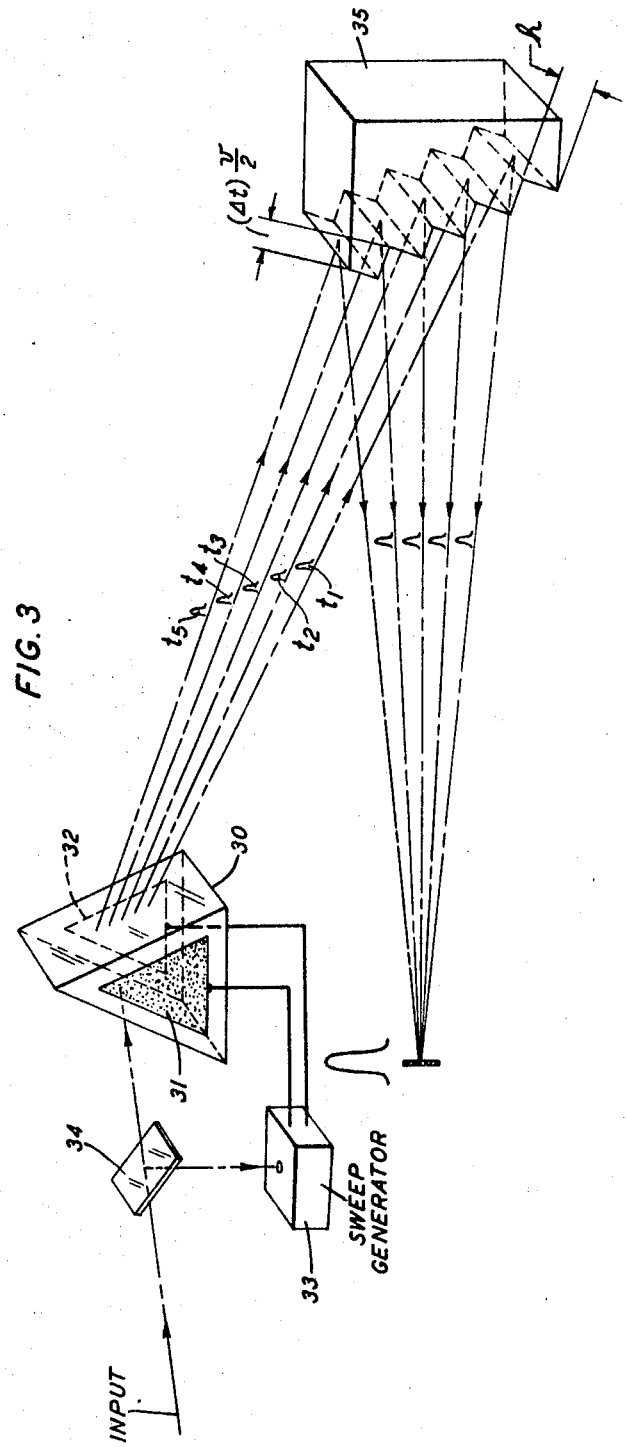
FIG. 3 shows a specific illustrative arrangement of the preferred embodiment of the invention using an electro-optical scanning prism and a stepped reflecting echelon.

Referring to the drawings, FIG. 1 shows in block diagram the basic elements of an optical wave peak power amplifier and buncher in accordance with an embodiment of the present invention. The device comprises a directional scanner 10 to which a beam of input optical wave energy is applied, a sweep generator 11 for operating scanner 10, and a delay network 12 for introducing a time delay to the wave energy derived from the scanner. The time delay introduced by network 12 varies as a function of the direction of propagation of the wave energy leaving the scanner.

In operation, a collimated input beam of intensity I is directed upon scanner 10. The input beam, which can be either a continuous wave or a pulse of energy, can be derived from either a laser, or any other suitable source. In the embodiment of FIG. 1 the input beam is shown as a pulse of time duration ΔT. It will be recognized that the input pulse represented in FIG. 1 is merely the envelope of the high frequency optical waves occurring during the indicated time interval.

Synchronized with the input pulse is the sweep generator 11 which activates the scanner at the start of the input pulse. It is the function of the scanner to displace transversely, or to change the direction of propagation of the optical beam as a function of time in accordance with the waveform derived from the sweep generator. For purposes of explanation, the sweep waveform is such that the angular deviation of the optical beam, as it traverses the scanner, is a linear function of time. Referring again to FIG. 1, the output from scanner 10 is shown as being deflected through an angle Δθ during the time interval ΔT. For purposes of explanation, five discrete directions of propagation (designated 1 through 5) are shown.

discrete directions of propagation (designated 1 through 5) are shown.

With the scanner synchronized with the input pulse, the various portions of the input pulse propagating along each of these five designated directions can be represented by the five pulses, or packets of wave energy, $t_1$, $t_2$, $t_3$, $t_4$ and $t_5$. (The pulse designations $t_1$ through $t_5$ are the times for which the envelopes of the five pulses are a maximum.)

Each of the pulses derived from scanner 10 propagates along a different path, and each occupies a unique time interval which corresponds to a portion of the input signal. For example, pulse $t_1$ corresponds to the leading portion of the input pulse. Pulse $t_5$ corresponds to the trailing portion of the input pulse. The remaining pulses $t_2$, $t_3$ and $t_4$, correspond to intermediate portions of the input signal. These are shown as dotted curves superposed upon the input signal.

The output pulses from the scanner are applied to the delay network 12. It is the function of the delay network to delay each pulse, relative to each other pulse, an amount sufficient to bring it into time coincidence with all the other pulses. As pulse $t_5$ is the trailing pulse, each of the other pulses is delayed an amount relative to pulse $t_5$. For example, the relative time delay introduced into the path of pulse $t_1$ is equal to $t_5-t_1$. Similarly, each of the other pulses is delayed a corresponding amount relative to pulse $t_5$. The effect of this relative time delay is to produce at the output of the delay network five pulses in time coincidence which, when focused upon a collection point or surface, produce a pulse of increased intensity but of shorter time duration than the input signal.

Recognizing that each of the pulses represents the envelope of a portion of the applied high frequency optical signal, it is then apparent that the instantaneous amplitude of the reassembled signal at the collection area depends upon the time-phase relationship of the high frequency signals represented by the several pulses. If the high frequency signals arrive at the collection area in random phase, the maximum intensity of the output pulse is proportional to N times the intensity I of the input signal, where N is the number of pulses arriving at the collection point. If, however, the input wave energy is phase coherent, and the path lengths are carefully adjusted so that the high frequency signals arrive in time phase, the intensity of the output pulse is proportional to $N^2I$, over a collection area $1/N^{th}$ the minimum size available with random phase addition.

Reassembling the pulses in time phase is accomplished by adjusting the time delay between adjacent channels of the delay network to an integral number of periods of the optical signal, to a precision of a small fraction of a period.

In the arrangement of FIG. 1, the several pulses are focused upon a common area. FIG. 2 shows an alternate arrangement wherein the output pulses leave the delay network along parallel paths. In such an arrangement the peak intensity of the output wave energy immediately adjacent to the delay network is equal to the peak intensity of the input signal for both the in-phase and random-phase cases. However, the energy is distributed over an area N times as large as the input beam.

If the pulses are reassembled in time phase, the effective aperture of the output beam is N times that of the beam produced when the pulses are reassembled in random phase. As a result, the diffraction angle of the in-phase beam is $1/N^{th}$ that of the random-phase beam, and in the far field, the peak intensity of the in-phase beam has N times the intensity of the random-phase beam.

FIGS. 3 through 6 show various specific means for implementing the form of the invention described in FIG. 1. In the first illustrative arrangement shown in FIG. 3, directional scanning of the input beam is accomplished by means of an electro-optical scanning prism 30 of the type described by F. S. Chen et al. in an article entitled, "The Use of Perovskite Paraelectrics in Beam Deflectors and Light Modulators," published in the October 1964 issue of the Proceedings of the Institute of Electrical and Electronics Engineers, pp. 1258-1259. As indicated in this article, a simple beam deflector can be made from a prism of electrooptical material such as, for example, potassium tantalateniobate (KTN), by the application to the prism of an electric field. In the illustrative embodiment of FIG. 3, the electric field is applied transversely to the direction of propagation of the optical beam by means of a pair of electrodes 31 and 32. In general, the direction of the electric field is not critical to the operation of the prism. Its application in the manner shown is done for convenience, since it places the electrode out of the optical path. Preferably, however, the direction of the electric field is parallel to the direction of polarization of the optical beam.

The electric field is generated by a sweep generator 33 which can be either free running or can be synchronized with some other equipment within the system. When the input signal is a pulsed signal, the sweep generator is advantageously synchronized with the input signal. This can be done by placing a partially reflective mirror 34 in the path of the input signal and using the reflected energy to trigger the sweep generator. Obviously, other means of synchronization can be employed.

The output from prism 32 is directed upon a stepped reflecting echelon 35 which, for purposes of illustration, has five reflecting surfaces. As it is the function of the echelon to reflect the pulses so that they reach the collection point is time-coincidence, each of the reflecting surfaces is spaced from the next adjacent surface a distance which corresponds to one-half the distance between adjacent pulses. If the scanning is a linear function of time, the step offset is uniform and equal to $$(\Delta t)\frac{v}{2}$$

where $v$ is the velocity of propagation of the wave within the medium between the prism and echelon, and $\Delta t$ is the time delay between pulses. For a linearly scanned beam, $\Delta t$ is equal to $\Delta T/N$, the pulse width $\Delta T$ of the input wave, divided by the number of steps N. The step spacing can readily be arranged to accommodate sinusoidal or exponential sweeps equally as well.

Since the intensity of the output pulse is a function of the number of steps in the echelon, the number of steps is advantageously made large.

The orientation of the reflecting surfaces of the echelon relative to the direction of propagation of the pulses is adjusted to provide the desired focusing properties.

To illustrate a specific set of parameters, let us use a 1 cm. beam of wavelength $\lambda = 6 \times 10^{-5}$ cm., and apply it to a 60° prism of KTN. An electric field of $9.5 \times 10^3$ volts per cm. will sweep the beam through an angle $\Delta\theta$ equal to $1.2 \times 10^{-2}$ radians. As the diffraction angle $\delta$ of a beam is approximately equal to the wavelength $\lambda$ of the beam divided by the beam size $a$, we have for a 1 cm. beam, $\delta \approx \lambda/a = 6 \times 10^{-5}$ radians.

With the angular sweep range $\Delta\theta$ of $1.2 \times 10^{-2}$ radians, the swept beam can be resolved into $\Delta\theta/\delta$ discrete beams, to give a dispersion factor D, in this case, of 200. The dispersion factor gives the optimum number of steps to be used in an echelon in a random phase system. The minimum distance L at which this resolution can take place is given by $L \approx a/\delta$. Substituting in this expression for $a$ and $\delta$, gives L=167 meters.

If the sweep time $\Delta T$ is $5 \times 10^{-9}$ seconds, the step offset is $$\frac{5 \times 10^{-9}}{200} \times \frac{3 \times 10^{-10}}{2} = 0.375 \text{ cm.}$$

The total offset of the echelon is 75 cm.

It will be noted that for the assumed parameters, the distance L between the prism and the echelon is large. This distance, however, can be reduced, if required, by means of a lens system (i.e., a telescope) located between the prism and the echelon, which decreases the beam aperture and correspondingly increases the sweep angle $\Delta\theta$ and the diffraction angle $\delta$.

The arrangement of FIG. 4 is a modification of the arrangement of FIG. 3 in which a second scanning prism 40 is interposed between the first scanning prism 41 and the stepped echelon 42. The function of the second scanning prism is to recollimate the optical beam so that each pulse is incident upon the echelon at the same angle. Taken as a unit, the two prisms can be considered the equivalent of a scanner which transversely displaces the input beam, as a function of time, in contrast to the scanner of FIG. 3 which changes the direction of propagation of the input beam. Other means for translating an optical beam can be employed. (See, for example, the copending application of A. G. Chynoweth, Ser. No. 329,050, filed Dec. 9, 1963.)

If, as is shown, the pulses reflected from the echelon are also to propogate along parallel directions, this embodiment has the advantage of substantially simplifying the echelon structure, since all the reflecting surfaces are parallel to each other. As a consequence, the echelon can be a commercial echelette or an echelon diffraction grating.

If, on the other hand, it is required that the output be focused, a focusing lens, not shown, can be added to the system, or a concave reflecting echelon can be used.

In each of the embodiments of FIGS. 3 and 4, a stepped reflecting echelon is used to produce the requisite time delay. Alternatively, a stepped transmission echelon, as shown in FIG. 5, can be used for this purpose. In this embodiment the echelon 50 is made of a transparent material having a refractive index $n$ greater than the refractive index of the medium between the echelon and the scanning prism. If the latter medium is air, the depth $d$ of each step of the echelon is then given by $$d = \frac{v}{(n-1)} \Delta t$$

where:

$v$ is the velocity of propagation of the pulse in the medium between the echelon and the scanning prism, and $\Delta t$ is the time between pairs of adjacent pulses.

FIG. 6 shows the use of optical fibers of unequal lengths as a delay network. As in the delay network of FIG. 5, the time delay necessary to bring the pulses into time coincidence is produced by causing each of the pulses to propagate through a path of predetermined length, and composed of a material having a refractive index that is different than that of the medium between the scanner and the delay network.

In the description given above, the input beam was referred to as a pulsed beam. However, as was also noted, the input beam can be a continuous wave which would be converted to a pulsed beam by the action of the device.

FIG. 7 shows in block diagram the basic elements of an optical wave peak power amplifier and buncher in accordance with the second embodiment of the present invention. This embodiment comprises a monochromatic optical source 70, a frequency modulator 71, and a dispersive medium 72. In operation, optical wave energy of frequency $f$, and power P is applied to the modulator 71. The optical wave energy can be in the form of a continuous wave or it can be a pulse. The power level and frequency of the wave applied to modulator 71 are illustrated graphically as a function of time by the curves 73 and 74, respectively.

The modulator 71 sweeps the optical beam over a frequency range $\Delta f$ in a time interval $\Delta t$ equal to $1/f_m$, where $f_m$ is the modulation frequency. This is indicated by curve 75, which shows the instantaneous frequency of the optical beam as a function of time as it leaves the modulator. The power level P of the frequency modulated beam is the same as before, as indicated by curve 76.

The dispersive medium 72 introduces a time delay which varies as a function of frequency. This has the effect of bunching up the wave energy over one-half of the frequency sweep and spreading it out over the next half of the frequency sweep. The result is to produce a series of pulses of time duration $1/2\pi\Delta f$, and repetition rate $f_m$. During the pulse duration, the peak power of the optical wave increases to a level $\pi\Delta f P/f_m$. Between pulses it is decreased to a level substantially less than P.

The optical source 70 can either be a laser or a filtered polychromatic source. The frequency modulator 71 can be a traveling wave modulator of the type described by I. P. Kaminow in his article entitled "Microwave Modulation of the Electrooptic Effect in $KH_2PO_4$," published in the Physical Review Letters, 6, page 528 (1961), or alternatively, the function of light source and frequency modulator can be combined in a laser in the manner described by A. Yariv in his article entitled "Electro-Optical Frequency Modulation in Optical Resonators," published in the June 1964 issue of the Proceedings of the Institute of Electrical and Electronics Engineers, pages 719–720.

The dispersive medium 72 can be any suitable transparent material having the requisite relative time delay over the frequency range of interest.

To illustrate a specific set of parameters, let us use a beam of wavelength $\lambda=9830$ A. and apply it to a modulator of the type described by Kaminow cited above. The resulting frequency deviation $\Delta f$ is given approximately by $$\Delta f = 4\pi l f_m \Delta n_o / \lambda$$

where:

$\Delta n_o$ is the amplitude of the refractive index variation in the KDP modulator described by Kaminow;
$l$ is the length of the KDP modulator; and
$f_m$ is the modulating frequency.

Substituting for these quantities $\Delta n_o = 10^{-5}$, $l = 100$ cm., and $f_m = 2.5 \times 10^{10}$ cycles per second, gives $\Delta f = 3.2 \times 10^{12}$ cycles per second.

This deviation is produced during the time interval $\Delta t$ equal to $1/2f_m$, or in $2 \times 10^{-11}$ seconds. Thus, the dispersive medium must produce a time delay equal to $2 \times 10^{-11}$ seconds over the frequency range of interest.

For a crystal of gallium arsenide, used as the dispersive medium, the rate of change in refractive index, $dn/df$, at 9830 A. is $2.1 \times 10^{-15}$ seconds. To produce a delay of $\Delta t$ seconds over the frequency range $\Delta f$, requires a crystal of effective length $$l = \frac{\Delta t c}{\Delta f \frac{dn}{df}}$$

Substituting the various values in this equation, we get that $l$ equals 89 cm.

The output from the dispersive medium consists of pulses of width $1/2\pi\Delta f$ equal to $5.0\times 10^{-14}$ seconds. The ratio of the peak power of these pulses to the input power is $\pi\Delta f/f_m$ or 400.

It should be recognized that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention.

What is claimed is:
1. In combination, for use in an optical system,
means for spacially separating portions of a collimated optical beam that are displaced in time relative to each other;
and a delay network for reassembling said separate beam portions in time coincidence.

2. The combination according to claim 1 wherein said optical beam is substantially monochromatic;
and wherein said delay network is adjusted such that the total relative time delays experienced by the wave energy in said separate portions differ by an integral number of periods for said optical wave energy.

3. In combination:
scanning means for changing the direction of propagation of a beam of optical wave energy as a function of time;
means for reassembling said wave energy in time coincidence comprising a delay network for providing a plurality of transmission paths whose optical lengths are a function of the direction of propagation of said wave energy relative to said scanning means.

4. The combination according to claim 3 wherein the outputs from said delay network propagate along parallel paths.

5. The combination according to claim 3 wherein the outputs from said delay network are focused upon a common surface.

6. In combination:
scanning means for transversely translating a beam of optical wave energy as a function of time;
means for reassembling said wave energy in time coincidence comprising a delay network for providing a plurality of transmission paths whose optical lengths are a function of the location of said beam.

7. In combination:
a laser source of optical wave energy;
means for specially separating portions of said wave energy that are displaced in time relative to each other;
a delay network for reassembling said portions of wave energy in time coincidence;
and means for detecting said reassembled optical wave energy.

8. The combination according to claim 7 wherein said source provides a continuous wave signal.

9. The combination according to claim 7 wherein said source provides a pulse of wave energy.

10. In combination, for use in an optical system:
an electro-optical scanning prism for changing the direction of propagation of a beam of optical wave energy through a range of angles as a function of time;
and means located within said range of angles for reassembling said wave energy in time coincidence comprising a delay network for providing a plurality of transmission paths whose optical lengths are a function of the direction of propagation of said beam.

11. The combination according to claim 10 wherein said delay network comprises a stepped reflection echelon.

12. The combination according to claim 10 wherein said delay network comprises a stepped transmission echelon.

13. The combination according to claim 10 wherein said delay network comprises a plurality of optical fibers of different optical lengths.

References Cited
UNITED STATES PATENTS

| | | |
|---|---|---|
| 2,721,259 | 10/1955 | Krasno. |
| 3,219,996 | 11/1965 | Masters. |
| 3,290,619 | 12/1966 | Geusic et al. 350—160 |
| 3,331,651 | 7/1967 | Sterzer 350—150 |
| 3,334,538 | 8/1967 | Steinhausen. |

FOREIGN PATENTS 1,376,013  10/1963  France.

RONALD L. WIBERT, Primary Examiner

E. BAUER, Assistant Examiner

U.S. Cl. X.R.

356—74